US007521834B2

(12) United States Patent
Patterson et al.

(10) Patent No.: US 7,521,834 B2
(45) Date of Patent: Apr. 21, 2009

(54) POLY-PHASE ELECTROMAGNETIC DEVICE HAVING AN IMPROVED CONDUCTOR WINDING ARRANGEMENT

(76) Inventors: Dean James Patterson, 103 Paces Brook Ave., #10332, Columbia, SC (US) 29212; Byron John Kennedy, 4/7 Weddell St., Parap. Darwin, Northern Territory 0820 (AU); Steven Peter Camilleri, 6 Coorong Court, Stuart Park, Darwin, Northern Territory 0820 (AU); Benjamin David Guymer, 66 Morehead Ave, Norman Park, QLD 4170 (AU); Matthew Campbell Greaves, 66 Morehead Ave, Norman Park, Queensland, 4170 (AU)

( * ) Notice: Subject to any disclaimer, the term of this patent is extended or adjusted under 35 U.S.C. 154(b) by 507 days.

(21) Appl. No.: 10/534,076

(22) PCT Filed: Nov. 13, 2003

(86) PCT No.: PCT/AU03/01495

§ 371 (c)(1),
(2), (4) Date: Feb. 23, 2006

(87) PCT Pub. No.: WO2004/047253

PCT Pub. Date: Jun. 3, 2004

(65) Prior Publication Data

US 2006/0232158 A1 Oct. 19, 2006

(30) Foreign Application Priority Data

Nov. 15, 2002 (AU) ............................. 2002952687

(51) Int. Cl.
*H02K 21/12* (2006.01)

(52) U.S. Cl. ...................................... 310/180; 310/268

(58) Field of Classification Search ................. 310/180, 310/268, 208, 206, 12
See application file for complete search history.

(56) References Cited

U.S. PATENT DOCUMENTS

| | | | | |
|---|---|---|---|---|
| 4,678,931 | A | 7/1987 | Olsen et al. | |
| 5,780,949 | A * | 7/1998 | Li | 310/198 |
| 5,925,959 | A * | 7/1999 | Bai et al. | 310/179 |
| 5,982,067 | A * | 11/1999 | Sebastian et al. | 310/184 |
| 5,994,812 | A * | 11/1999 | Muszynski | 310/180 |
| 6,424,073 | B1 * | 7/2002 | Kometani et al. | 310/263 |
| 6,534,894 | B1 * | 3/2003 | Flowerday | 310/268 |
| 6,703,747 | B2 * | 3/2004 | Kawamura | 310/179 |
| 7,155,805 | B2 * | 1/2007 | Nakamura | 29/596 |

(Continued)

FOREIGN PATENT DOCUMENTS

EP 0 124 267 A2 11/1984

(Continued)

*Primary Examiner*—Gary F. Paumen

(57) ABSTRACT

A poly-phase electromagnetic device having n winding phases (n>2) wherein each phase is made from a single conductor strand wound in a lap form configuration. The windings are configured such that on assembly to a slotted magnetically conducive base a maximum of n−1 end turns overlapping is achieved so that the slot packing density can be optimized. The preferred configurations also enable neat and compact terminations which facilitates efficient packaging of the completed device. The windings are made either from discrete bobbins which are electrically interconnected upon assembly to the base, or alternatively from strings of continuously formed sub-windings. The latter process in particular enables full or partial automation of the winding and/or assembly process.

31 Claims, 7 Drawing Sheets

9

10

U.S. PATENT DOCUMENTS

2002/0060505 A1 * 5/2002 Kawamura .................. 310/184

FOREIGN PATENT DOCUMENTS

EP 1 039 616 A2 9/2000
EP 1 109 289 A2 6/2001
EP 1 134 872 A2 9/2001
WO WO 86/03900 7/1986

* cited by examiner

POLY-PHASE ELECTROMAGNETIC DEVICE HAVING AN IMPROVED CONDUCTOR WINDING ARRANGEMENT

FIELD OF THE INVENTION

The present invention relates to poly-phase electromagnetic devices such as motors, generators and transformers, of the kind that employ a toothed or slotted magnetically conducive structure into which an electrically conductive winding is wound.

BACKGROUND OF THE INVENTION

The invention has been developed primarily for use in axial flux motors and will be described in detail in reference to this application. However, it will be appreciated by those skilled in the art that the inventive principles are equally applicable to radial flux motors or generators and indeed any other electromagnetic device that includes a slotted magnetically conducive structure into which a conductive winding is wound.

Any discussion of the prior art throughout the specification should in no way be considered as an admission that such prior art is widely known or forms part of common general knowledge in the field.

BACKGROUND

When trying to optimise the power to size and/or weight ratio of a poly-phase electromagnetic device such as a motor of the kind described above, the packing and spacing of the electrical conductor phase windings within the magnetically conducive base is an important factor. In this regard the use of a magnetically conducive base within which the magnetic flux is constrained has the known advantage of effectively concentrating the magnetic field. This improves functionality of the motor due to a higher concentration of magnetic flux, at the same time reducing the precision necessary for machining and operating tolerances due to an increase in the minimum separation of air gaps that can exist between stationary and moving parts.

In order to optimise the power density of the device, it is desirable to have a base and winding configuration that is capable of minimising the size and mass of the magnetically conducive base that is required. This in turn will reduce the cost of the device through reduction in construction material, as well as reducing the parasitic losses within the base material that are present when the device is operating.

This has been a particular problem with, for example, known three phase motors where the phase windings are wound in a wave or lap form progressively one upon the other with each phase offset. This results in uneven slot packing due to physical interference of separate phase windings in the region between slots, known as the end turn, since in some places there must be three windings occupying the same end turn space. This means the slots and base must be sized to accommodate three windings even though those slots will only need to house one winding, resulting in redundant mass and material in the base. Further, the non-active end turns of such an arrangement have to be fairly long because of the increased slot depth and uneven packing in each slot. This results in bulky end turns that make it difficult to adapt such motors for use where housing space is minimal. Further, it is a waste of expensive conductor winding materials and also has significant negative impact on operational efficiency due to unnecessary Ohmic heating in the lengthened conductors.

An alternative method is also employed where extremely long non-active and turns are employed, allowing enough room for each end turn to completely clear the others and simultaneously filling the slot completely, however the prohibitively long end turn employed in this case causes the same material wastage and efficiency problems as those mentioned with the previous technique.

One solution proposed by the applicant has been to provide a three phase, multiple conductor strand, wave winding arrangement for an axial flux motor that achieves a maximum of two phase end turn overlaps between slots, thus giving reduced end turn lengths around the majority of motor periphery. However, this arrangement still requires external joining of the multiple conductor strands at the ends of each phase winding. This inevitably results in a series of bulging connections that extend radially beyond the rest of the windings concentrated at one location, making efficient packaging of the motor almost impossible. Further the process is very labour intensive and not suited to any convenient form of automation which in turn adversely affects the economic viability of such a design.

It is an object of the present invention to overcome or ameliorate one or more of the discussed disadvantages of the prior art, or provide a useful alternative.

DISCLOSURE OF THE INVENTION

According to a first aspect of the invention there is provided a poly-phase electromagnetic device having n winding phases (where n is greater than 2), said device including:

n separate electrical conductor phase windings, each completed phase winding being in the form of a continuous electrical conductor strand;

a magnetically conducive base having a plurality of slots adapted to receive active portions of the phase windings therein;

each said phase winding comprising a series of interconnected lap form sub-windings, with each sub-winding defining two active arms that extend through two spaced apart non-adjacent slots in the base, the active arms being joined by one or more suitably formed end turn and/or two connecting arms for connection with adjacent sub-windings or terminals;

wherein said phase windings are configured such that on assembly of the phase windings to the magnetically conducive base there is a maximum of n−1 sub-winding end turns overlapping, while the length of the end turns are simultaneously minimised.

Preferably the end turns are each offset from the plane in which the active arms are formed to provide clearance between overlapping end turns and so optimise packing density of electrical conductor within the slots of the magnetically conducive base.

In a preferred form the device has three phase windings each made from lap form sub-windings including two or more full loops of conductor strand defining two active arms interconnected by two end turns, each arm and end turn including therein two or more generally co-extending conductor strands, with a lead in and a lead out from said loops defining the respective connecting arms. In one form the device has alternative sub-windings wound in opposite directions, with the completed phase windings intertwined in a plait like configuration to achieve the n−1 end turn packing configuration.

In a first form, the lap form sub-windings are manufactured in the form of discrete bobbins comprising a multiple of conductor strand turns with connection points at each end for joining with an adjacent bobbin of the same phase. In this form, the connecting arms are configured to extend within gaps formed closely adjacent the magnetically conducive base. In an alternative form the lap form phase windings are formed from a continuous length of conductor strand to form interconnected lap sub-windings which is a structure particularly suited to mass production techniques.

A first preferred method of producing a three phase device according to the invention includes the step of first winding each phase by winding a single conductor strand on to a former to create a string of interconnected lap form subwindings having suitably formed end turns which can then be assembled onto the base either by first plaiting the phases together and then assembling on to the base, or plaiting as they are assembled directly into the base. In another form extended end connectors are used so that the need to plait between overlapping end turns is avoided. This is achieved by forming each phase in two separate half strings as described hereafter.

According to a second embodiment of the invention there is provided a poly-phase electromagnetic device having n winding phases (where n is greater than 2), said device including:

n separate electrical conductor phase windings, each phase winding being made from a single electrical conductor strand;

a magnetically conducive base having a plurality of slots adapted to receive active portions of the phase windings therein;

each said phase winding comprising a series of spaced active arms that extend through spaced apart non-adjacent slots in the base, each active arm being connected with an end turn or terminal in a continuous wave formation;

wherein said phase windings are configured such that on assembly of the phase windings to the magnetically conducive base there is a maximum of n−1 sub-winding end turns overlapping while simultaneously minimising the lengths of the end turns.

Preferably, the phase windings are intertwined in a plait like configuration to achieve the n−1 end turn packing configuration.

In a preferred form, each phase winding is made as a single thickness pressing from sheet conductor material.

In a preferred form, the poly-phase electromagnetic device comprises a three phase axial flux motor or generator.

BRIEF DESCRIPTION OF THE DRAWINGS

Preferred embodiments of the invention will now be described by way of example only, with reference to the accompanying drawings in which.

PREFERRED EMBODIMENTS OF THE INVENTION

Figure 1:
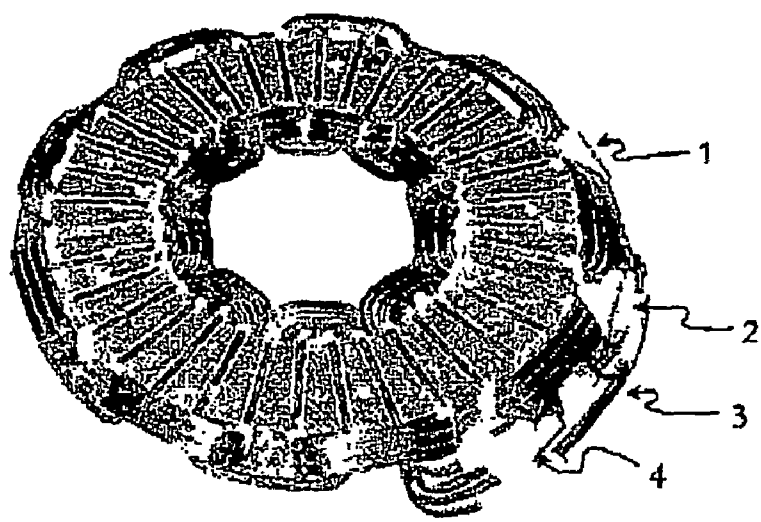
FIG. 1 is a photograph of a prior art three phase multiple conductor strand axial flux stator with n−1 overlap wave winding showing the bulging conductor strand end joins.

FIG. 1 shows a complete prior art three phase axial flux motor/generator stator having a wave winding configuration showing the problems with bulging connections 1. 2, 4 where the multiple strands of each phase winding are joined. The increase in radius of the stator is clearly visible at this point. This is a distinct disadvantage with this form of motor winding, increasing the level of shaft concentric diametric clearance required around the motor and at the same time increasing the cost and size of any casing that might be used. The windings produced are also extremely complex, typically requiring CNC manufacture from copper plate which is expensive and wasteful, or jig winding with a high degree of complexity, as many different bends of different radius are required. As an added level of complexity, once a single strand of winding is complete each turn needs to be end joined, which requires marking each individual end and ensuring that appropriate ends are joined together and insulated from other ends, all within a confined space. Automation of this process is extremely difficult.

Figure 2:
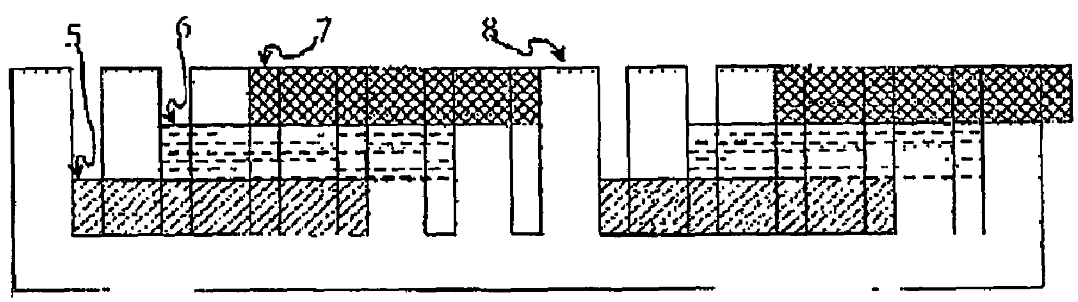
FIG. 2 is a schematic illustration of a common prior art three phase winding slot packing arrangement.

FIG. 2 is a schematic diagram which a common prior art method used for stacking a three phase winding within a slotted magnetically conducive base, the diagram being simplified by showing a linear motor/generator stator rather than an axial flux or radial flux stator. The diagram shows three phases 5, 6 & 7, and slotted magnetically conducive base 8. The end turn region shown front on under 7 shows the area where all three phase end turns overlap. Due to all three phases interfering or overlapping in this region, this is defined as a conventional n phase n overlap winding system. As can be seen from the diagram, only a small amount of winding cross section fits into the slot area so slot packing density is poor. An alternative prior art method employs extremely elongated end turns which may be overlapped without such a serious compromise on slot packing density, however this method suffers from an increased material requirement and Ohmic heating losses in the elongated end turns. While these methods for stacking a winding within slots are very simple to construct with each winding being wound separately on top of the previous, they do not lend themselves to an efficient design in terms of either materials use or electrical efficiency.

Figure 4:
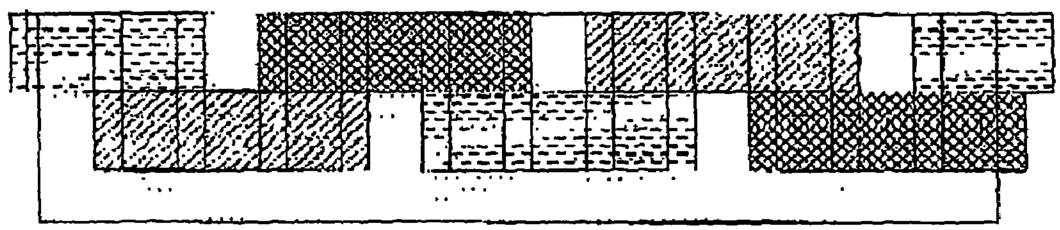
FIG. 4 is a schematic illustration of an n−1 end-turn overlap winding arrangement for a three phase device according to the invention.

FIG. 4 is a simplified diagram in the same style as FIG. 2, however showing an improved winding stacking arrangement in accordance with a part of this invention, whereby end turn interference is reduced. The diagram shows that only two end turns interfere with each other for a three phase system, hence n−1 overlaps in n phases.

Figure 3:
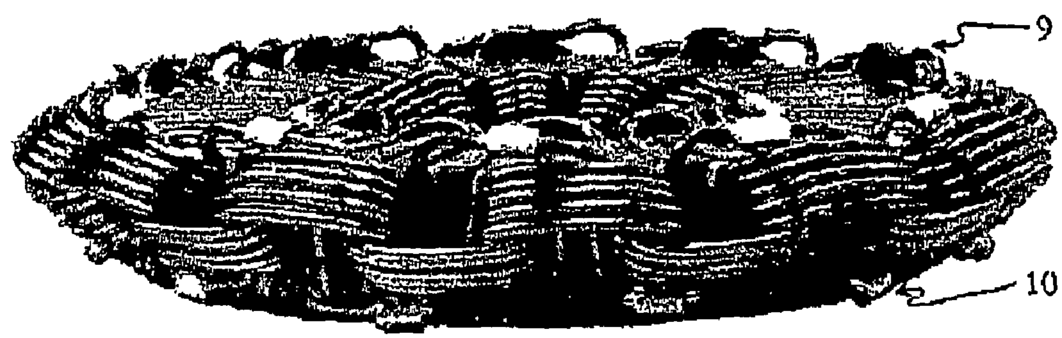
FIG. 3 is a photograph of a first embodiment three phase, axial flux stator which has been wound according to a first aspect of this invention.

FIG. 3 shows a complete first embodiment three phase axial flux motor/generator stator in accordance with the first aspect of the invention. The conductive winding shown inserted into the slotted magnetically conducive base can be constructed by several methods. The first method is to construct separate elements or "bobbins" comprised of a lap winding each with trailing ends. Half of these elements are wound in a forward winding direction and half in a reversed direction. The reversed lap winding elements are then placed next to each other in the slotted magnetically conducive structure. The forward wound lap winding elements are then stacked in the remaining free slots on top of the reverse wound lap winding elements, in a mirrored fashion. The trailing ends of the bobbins within each phase are then interconnected to form end joins, one end of each of the phases connected together to form a star point and the remaining ends left free as the motor/generator termination point. End joins are required both at the top of the structure 9 and at the bottom of the structure 10. FIG. 3 also shows an exemplary arrangement of conductors in individual detail rather than just an envelope containing the windings as the following computer generated images discussed show. It should also be noted from this illustration that the length of each lap in each individual sub-winding changes due to a variation in the length of end turn. This variation tends the complete sub-winding end turn envelope to a shape at each end of the sub-winding similar to part of the surface of a cone, a feature that is a result of the need to travel in a circumferential direction without interfering with the end turns of neighbouring bobbins.

Figure 5:
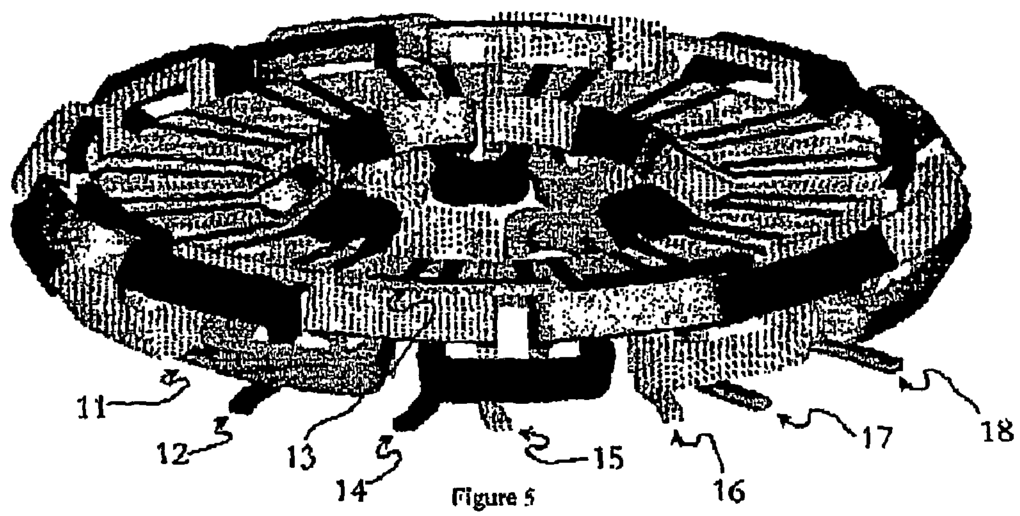
FIG. 5 is a computer generated perspective illustration of the wound stator shown in FIG. 3, including end terminations for clarity.

FIG. 5 shows a computer generated model of the first aspect of the invention as shown in FIG. 3. For clarity, each of the three separate phases is shown in a different shade. Upper 13 and lower 11 end joins are shown as in FIG. 3. For simplicity, the windings have a rectangular cross section which reflects the envelope that would typically contain multiple loops of conductor strand as shown in detail in FIG. 3. Winding termination points 12, 14, 15, 16, 17 & 18 show the beginning and end of each respective phase. Typically three of these terminations are connected together in a known fashion to form a star point and the remaining three used as the three motor phase terminations, permutations of which will cause motor direction or phase labelling to change in a known and predictable manner.

Figure 6:
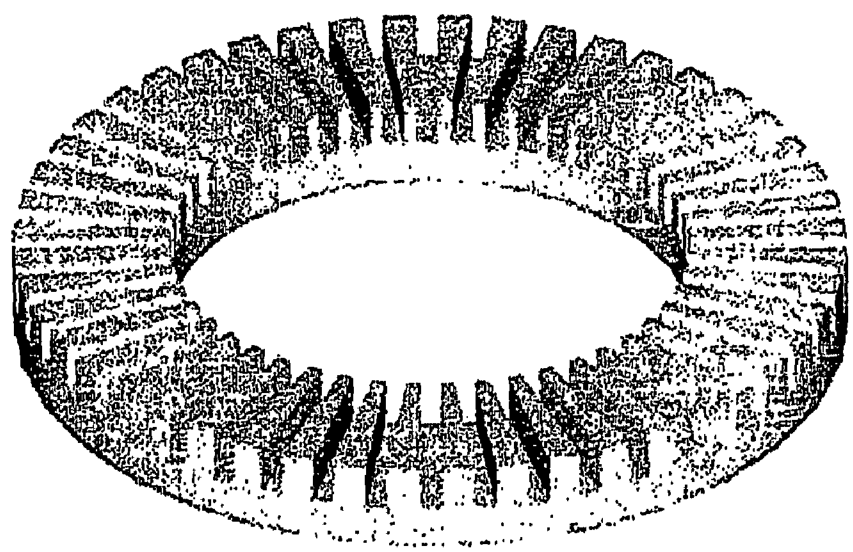
FIG. 6 is a computer generated perspective illustration of the slotted magnetically conducive base of the stator shown in FIG. 5, without the three phase winding.

FIG. 6 shows only the magnetically conducive base portion of FIG. 5, with the windings removed. The slots in the structure can be clearly seen in this illustration.

Figure 7:
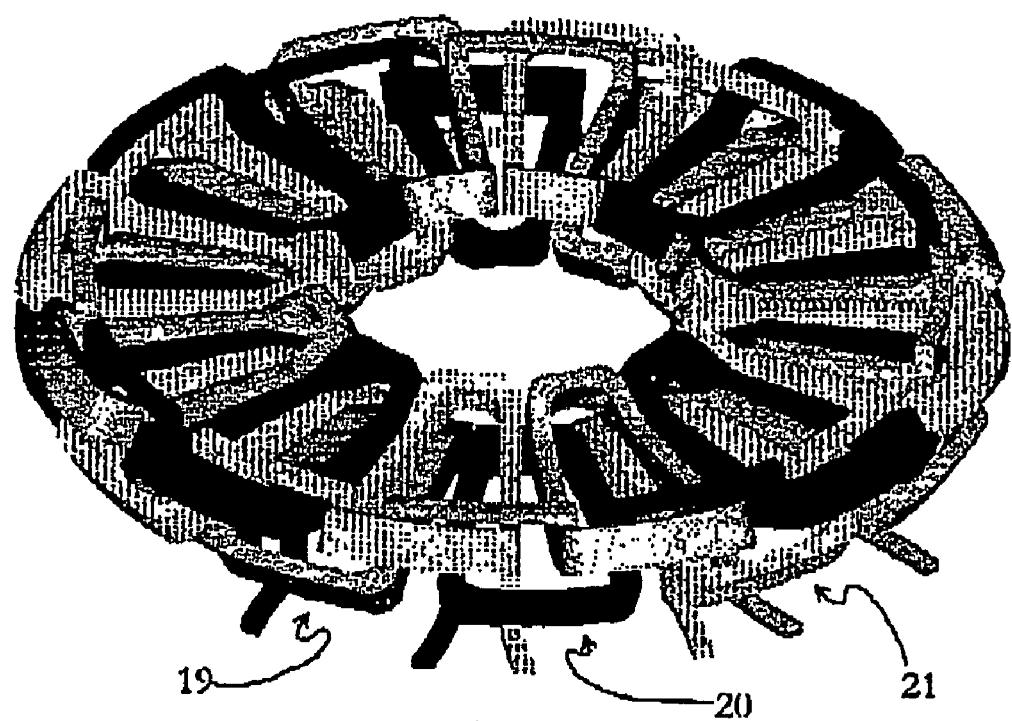
FIG. 7 is a computer generated perspective illustration showing only the three phase winding of FIG. 5, without the magnetically conducive base.

FIG. 7 shows only the three phase winding portion with end terminations of FIG. 5, not showing the magnetically conducive base. As in FIG. 5, each of the three separate phases 19, 20, 21 are shown in a different shades.

Figure 8:
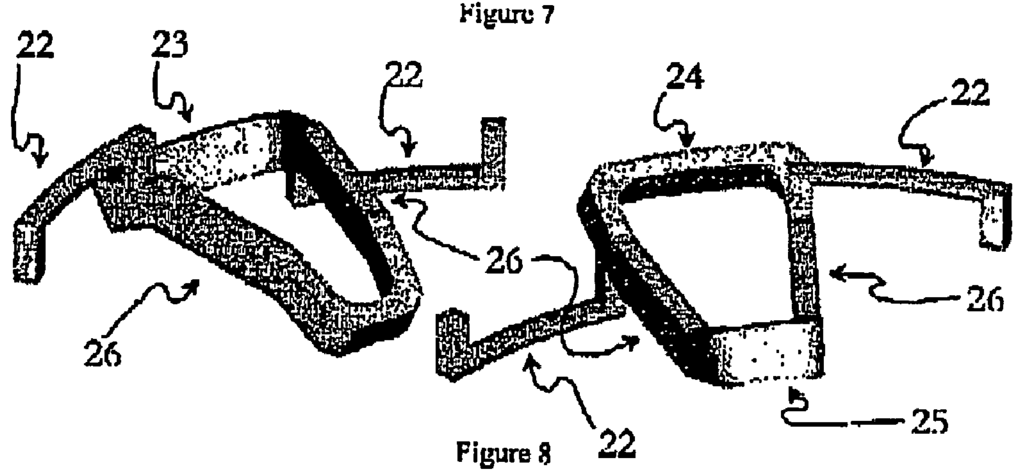
FIG. 8 is a computer generated perspective illustration of two examples of lap form sub-winding or "bobbin" as would be employed in the example of FIG. 5 having opposite winding directions.
Figure 9:
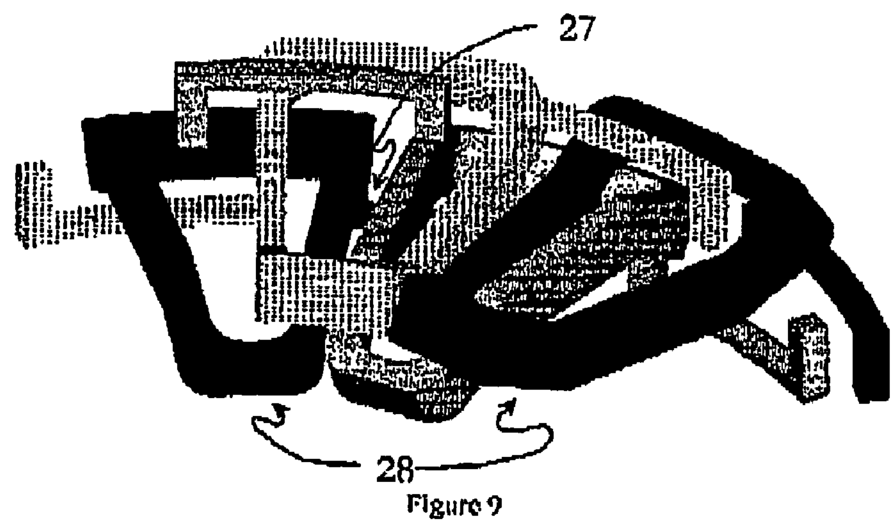
FIG. 9 is a computer generated perspective illustration of several intertwined bobbins, indicating the relative positions of the bobbins for each phase, as would be employed in the example of FIG. 5.

FIG. 8 shows two types of discrete lap form sub-windings or "bobbins" which suit the embodiment shown in FIGS. 3 & 5. The two lap elements shown are wound in opposite directions and are not identical, also called an upper and lower bobbin. Whilst end turn bend directions are the same for the two bobbins, the position of the connecting arms is reversed to suit the reversed winding direction. Each bobbin is formed of two or more coextending electrical conductor strands, however as mentioned previously the simplified computer generated diagram only shows the envelope which would enclose those strands. Each sub-winding defines two active arms 26 that extend through two spaced apart non adjacent slots when placed within the base, joined by suitably formed end turns 23, 24 & 25 and two connecting arms for connection with adjacent sub-windings or terminals 22. Preferably the end turns for a lower bobbin both bend downward and the end turn for an upper bobbin both bend upward as shown. Ideally the connecting arms do not extend directly radially outward, as this would interfere with the end turns. Instead, the arms extend generally axially upward or downward to fit neatly into gaps formed between the end turn and the base to help control the overall packing volume of the device. FIG. 9 is a close-up diagram of a portion of FIG. 7, showing only four bobbins. This diagram is included to indicate the relative positioning of each bobbin with respect to adjacent bobbins. Two bobbins 28 in this Figure are of the same phase winding and are therefore connected via end connector 27.

Figure 10:
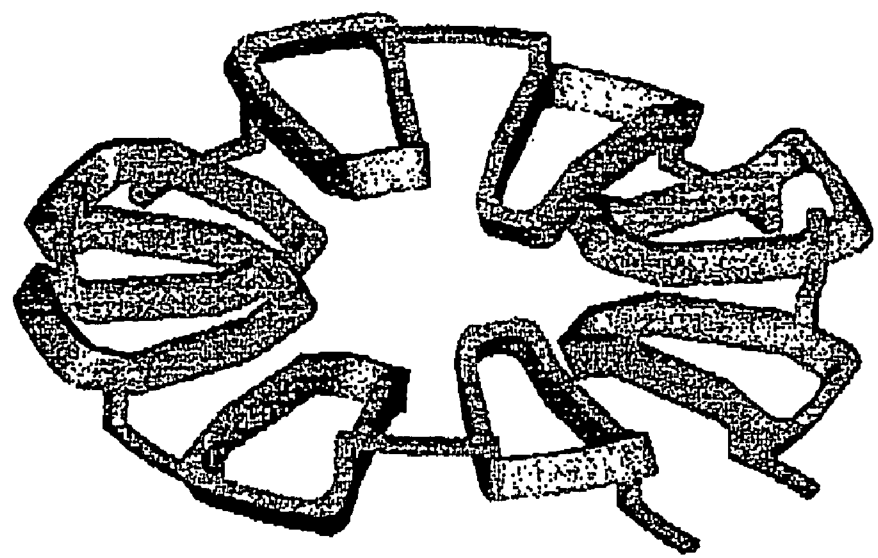
FIG. 10 is a computer generated perspective illustration of one of three single complete phase windings as would be employed in the example of FIG. 5.

FIG. 10 shows a single complete phase winding which suits the embodiment shown in FIGS. 3 & 5. This particular winding is comprised of four upper and four lower bobbins and shows winding terminations. When a completed winding such as the one demonstrated in FIG. 10 is to be manufactured by the aforementioned method with discrete bobbins, then eight separate bobbins are required and must be each electrically end joined by a method such as crimping and soldering. Typically, the end joining would be achieved after the bobbins had been inserted into the slotted magnetically conducive base.

Figure 11:
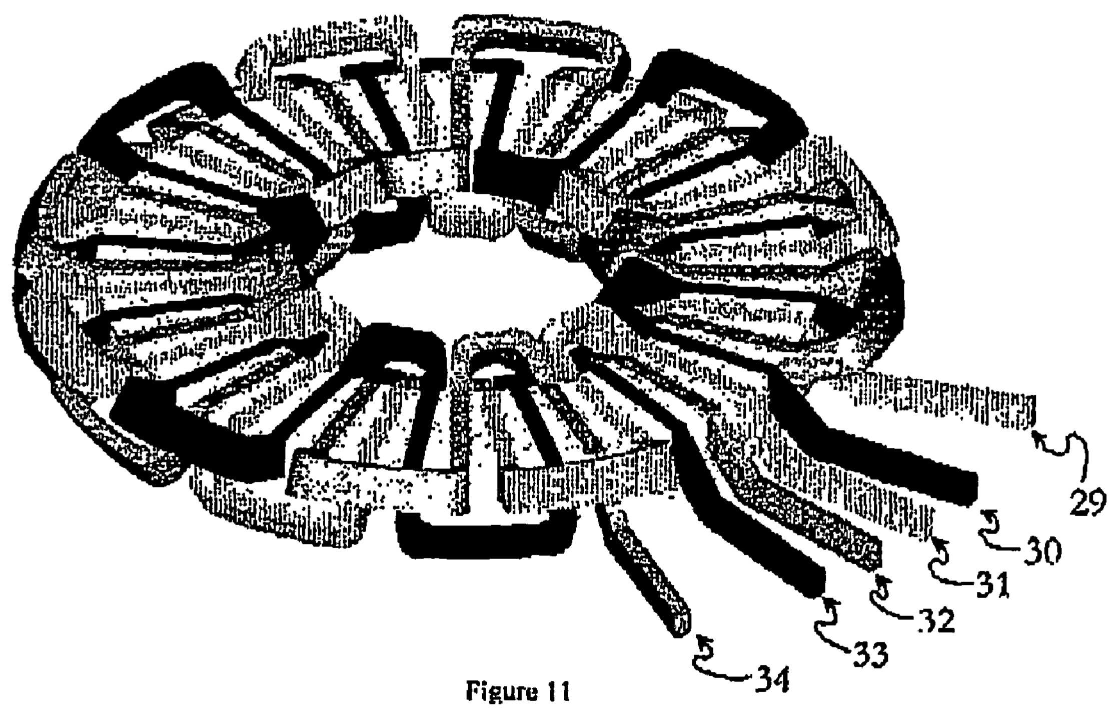
FIG. 11 is a computer generated perspective illustration of another embodiment made in accordance with a second aspect of the invention, with only a single conductor strand employed for each phase winding, negating the need for end joins.
Figure 12:
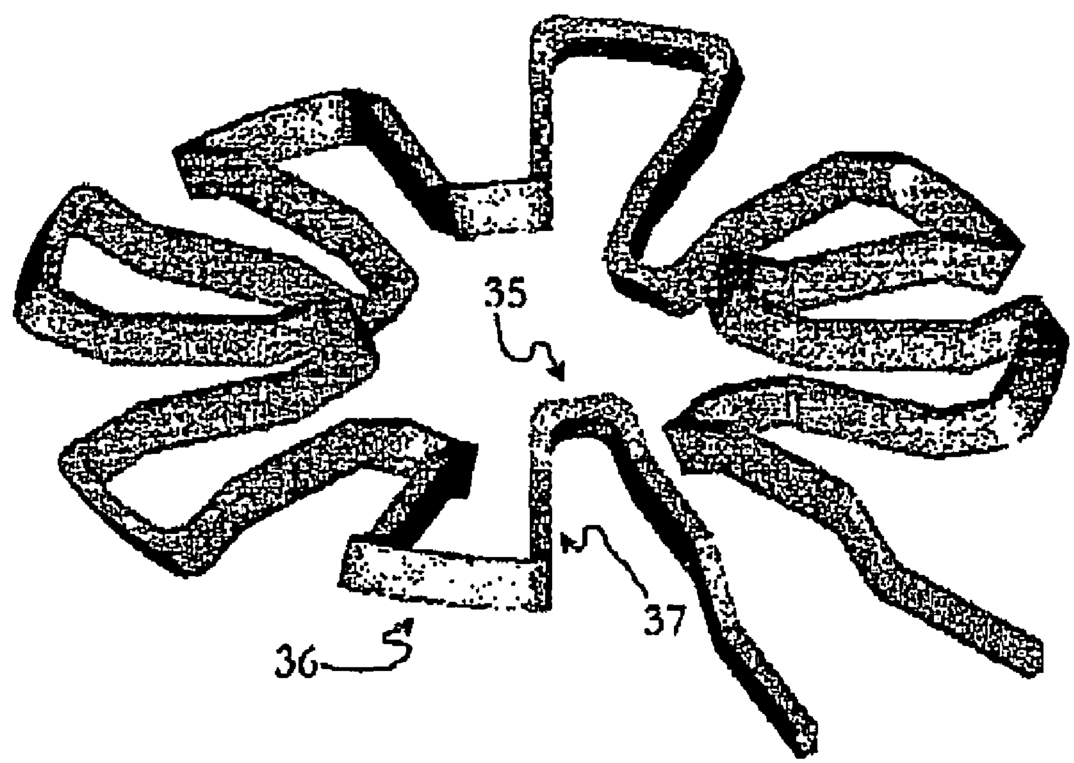
FIG. 12 is a computer generated perspective illustration of one of three complete phase windings as would be employed in the example of FIG. 11.

Another method and structure refers to lap windings with only a single conductor in each lap, whereby only a single strand of conductor is used rather than two or more coexisting strands. These can be more easily manufactured by a drop forging, pressing or similar methods. Windings formed in this manner can be known as single turn windings, are more simple since they do not require end joining, and may look like the axial flux example shown in FIG. 11. Features 29, 30, 31, 32, 33 & 34 represent end terminations of the three phase winding and may be connected in an identical manner as described for FIG. 5 previously. This method has advantages in special cases which require high current, torque and/or efficiency, along with simple manufacturing, however is less flexible due to the inability to vary the number of turns in each lap. The windings can either be formed separately for simplicity, since all three windings are the same, or all three formed simultaneously incorporating a star point and termination points at the same time. An example of an individual winding formed using this process is shown by illustration in FIG. 12. Note that whilst bobbins are not required for this winding, an "end join region" is still needed to overlap other phases, and this end join region still needs to be bent either up or down to form the required clearances. Similarly to multiple loop aspects, the single loop winding retains end turn features 35 and 36 as well as active arms 37, however connecting arms are not required and are omitted.

Figure 13:
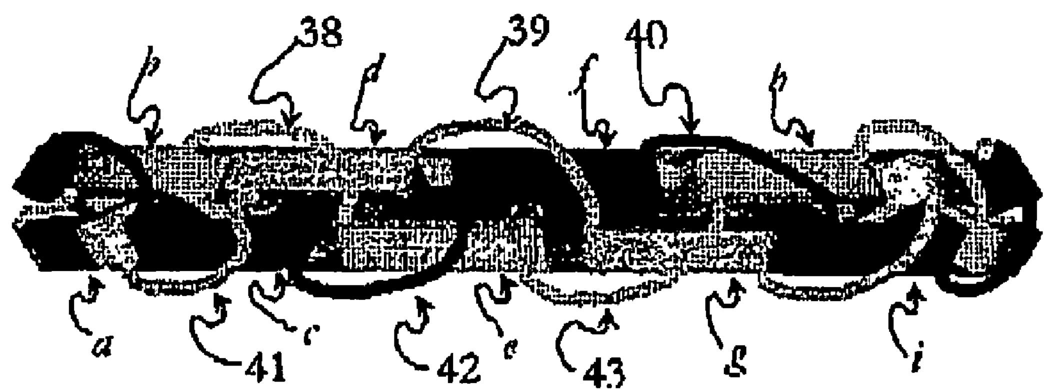
FIG. 13 is a computer generated side illustration showing an alternative location for end-joins in order to allow continuous winding.

Side view illustration FIG. 13 shows a completed winding containing three phases 38, 39 & 40, however an alternative location for the connecting arms is shown. This alternative location allows all three phases to be wound in a continuous interconnected fashion. These phases are thus continuously wound without electrical interconnection required, negating the need to end join separately. Phases such as shown may be manufactured by first forming a string of connected bobbins or sub-windings from a single length of conductor, preferably using a CNC wire forming process in the case of thick wire such as depicted in FIG. 3 or alternatively a thermally-bonded air coil forming process in the case of more pliable thinner conductor strand. Following this process the completed phases may be plaited together and the completed winding then inserted directly into the magnetically conducive slotted base. Alternatively, the phases may be plaited as part of the insertion process by taking careful note of insertion order. Beginning with the sub-winding labelled a and inserting sub-winding e adjacent allows sub-winding b to) be inserted. By flexing the connecting arms between the first and second sub-winding of phases 38 and 39, phase 38 may then be bent underneath phase 39 and sub-winding e inserted. Sub-winding d then follows, phase 39 bent around 40 and sub-winding g inserted. Similarly f can be inserted easily, phase 40 bent around 38 and sub-winding i inserted, and so on. It will be appreciated that this process is simple enough to be accomplished by skilled manual labour but can be just as easily adapted to an automated process, and works equally as well for both thick and thin wire.

Figure 14:
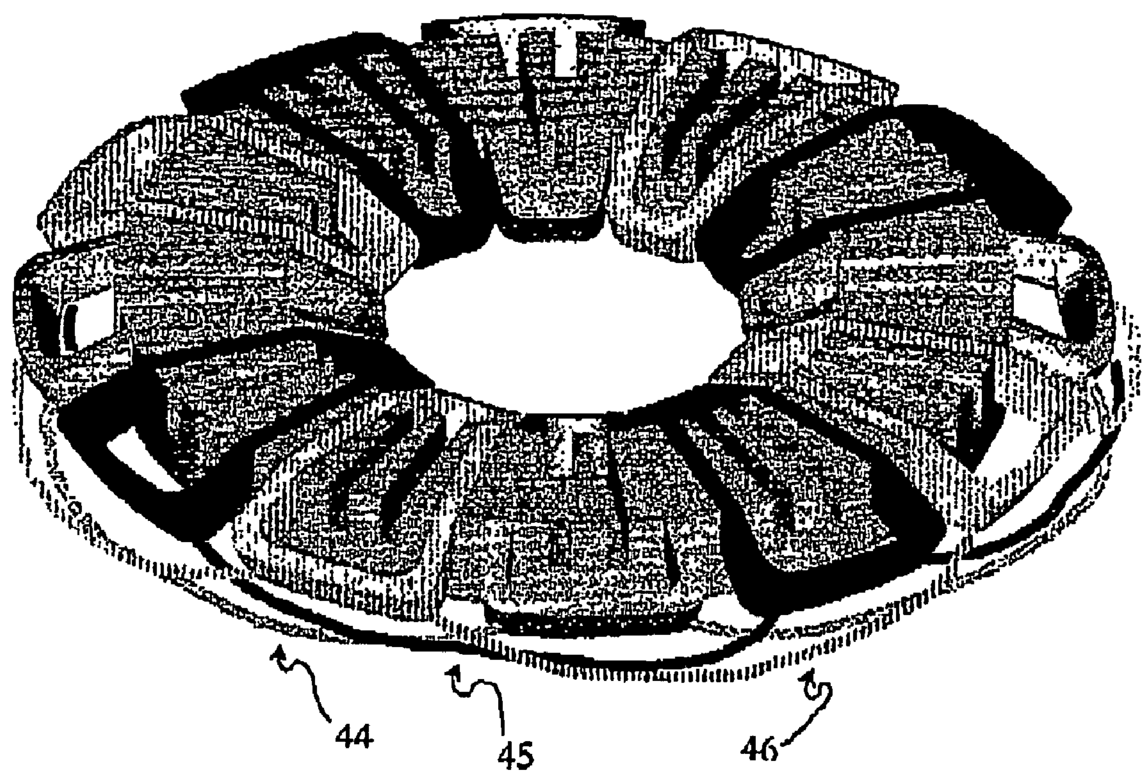
FIG. 14 is a computer generated perspective illustration showing a half complete winding with an alternative configuration for end-joins in order to allow continuous winding.
Figure 15:
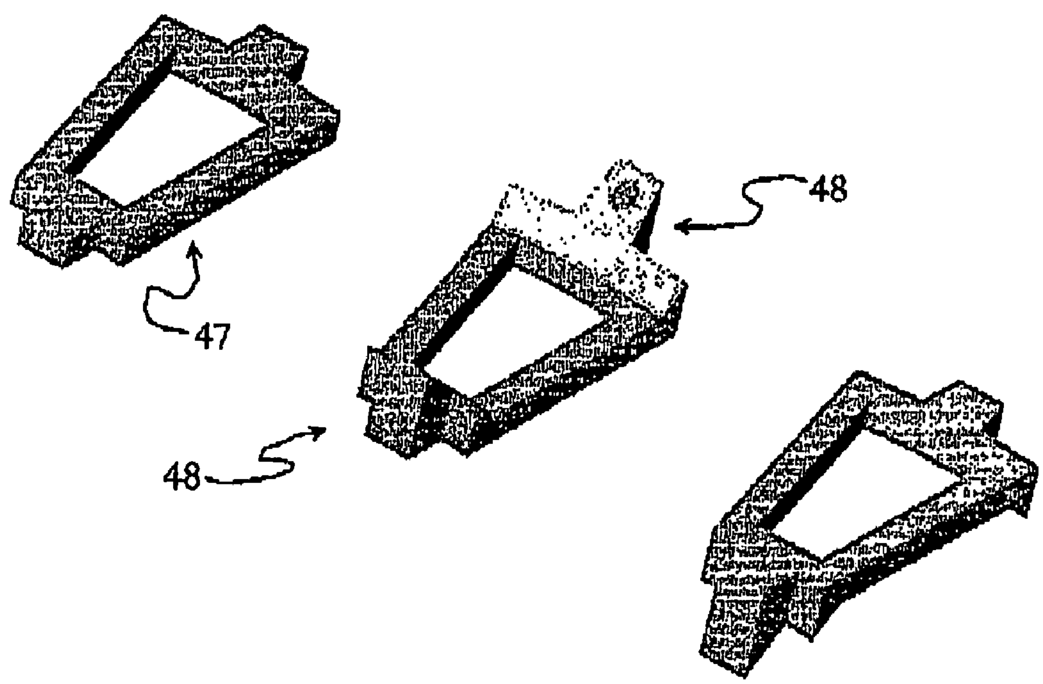
FIG. 15 is a computer generated perspective illustration showing a prior art press member and press member suitably shaped to form end turn configurations in accordance with this invention.
Figure 16:
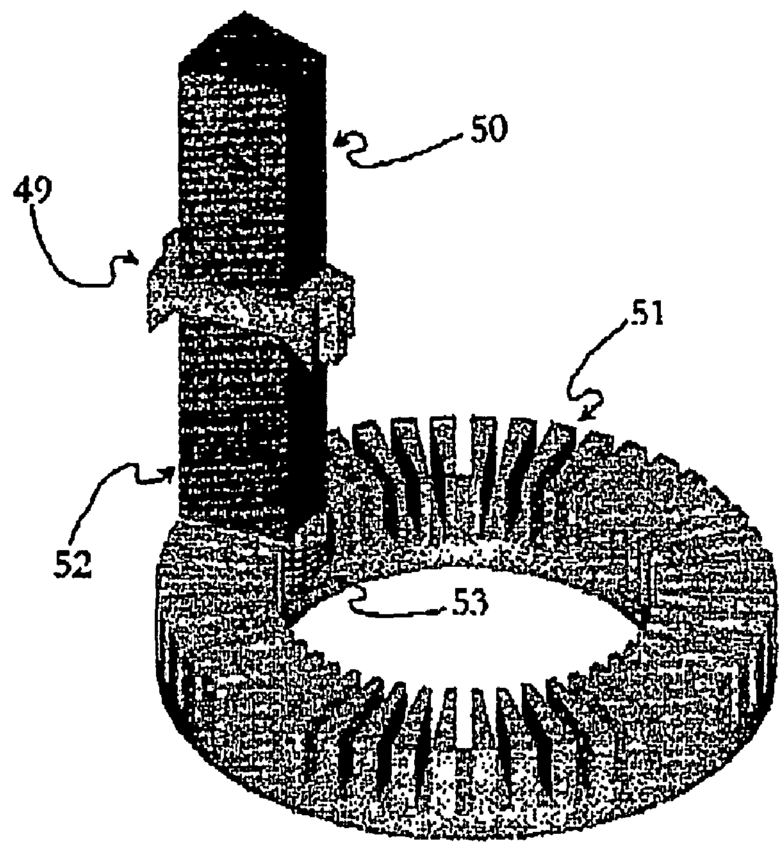
FIG. 16 is a computer generated perspective illustration showing an elongated winding former used for forming lap form sub-windings with offset end turns in accordance with this invention.

In some cases it may be necessary to manufacture sub-windings from many turns of thin conductor and a simple and wholly automated process for winding manufacture used. In this situation it may be preferable to increase the length of connecting arms 44, 45 and 46 as shown in FIG. 14, which will increase the amount of conductor required for the entire winding but allows an entire set of bottom bobbins to be formed and connected before any top bobbins need to be formed, also negating the need to alternate end turns up and down between interconnected bobbins. This winding may be achieved by using a method similar to that described in European patent application EP0124267 but with a modified press plate. FIG. 15 shows the original press plate design 47 disclosed in EP0124267 and modified design showing end turn forming regions 48. An arrangement as shown in FIG. 16 using modified press plate 49 & elongated winding former 50 may have a winding 52 formed in a spiral fashion about it, shedding conductors in a lap form 53 into magnetically conducive base 51 directly. Once the desired number of turns have been wound press plate 49 descends and performs both the function of pressing the sub-winding firmly into slots and forming end turn offsets. Using the longer connecting arm process shown in FIG. 14 the entire bottom set of sub-windings can be formed in this manner. Once this is achieved, the process can be repeated on a winding jig of slot configuration and shape identical to the magnetically conducive base, and the resultant second set of bottom sub-windings inverted to form a set of top windings for the original magnetically conducive base once transferred. It may be necessary in this case to have twelve terminations rather than the usual six, however it should be appreciated that the process will reduce construction time and in some situations may give additional advantages.

Figure 17:
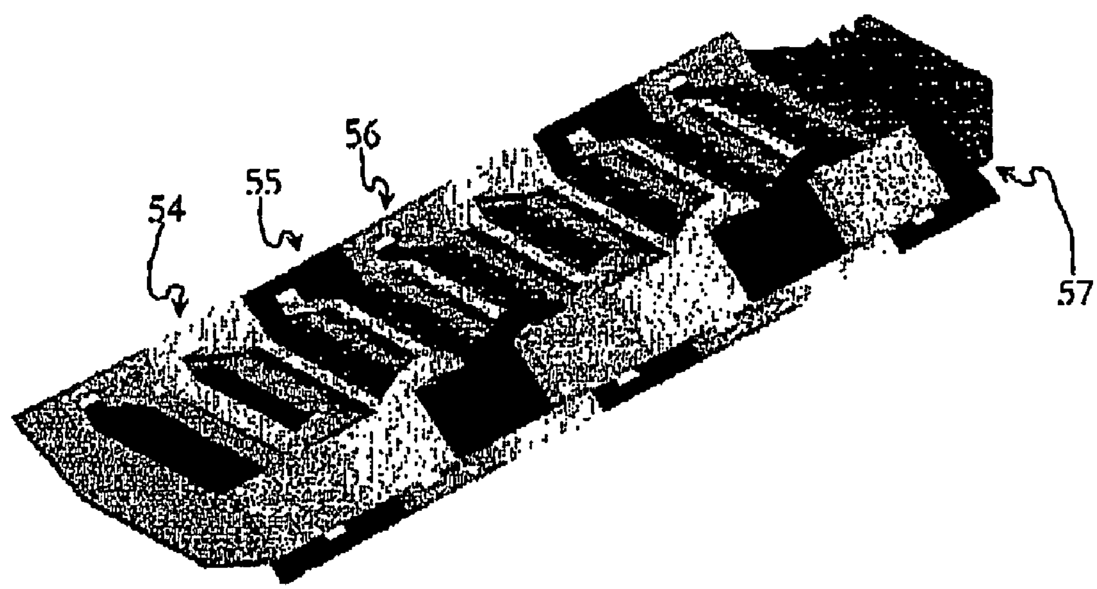
FIG. 17 is a computer generated perspective illustration showing a linear configuration of lap form sub-windings and magnetically conducive base in accordance with this invention. For explanatory purposes the magnetically conducive base has been extended to show slot location.

As some demonstration of the scope of the invention and for clarity, a three phase linear stator incorporating the invention is depicted in FIG. 17. Three phases 54, 55 and 56 are shown as well as magnetically conducive base 57. It will be appreciated by those skilled in the art that deforming this linear stator such that the vertical edges at each end of the base are bent to meet then an axial flux stator will be formed, whilst if the horizontal edges at each end of the base are bent to meet then either an inside rotor or outside rotor radial flux stator will be formed depending on whether the upper or lower horizontal edge is used. From this perspective it should be clear that the invention applies just as well to each geometrical configuration.

Accordingly, whilst the invention has been described with reference to specific examples of axial flux motors, it will therefore be appreciated by those skilled in the art that the various aspects of the invention may be embodied in many other forms. In particular the invention suits the common radial flux motor/generator geometry in both internal and external rotor variants. The invention can be equally applied to other electromagnetic applications such as transformer windings in situations were the improved packing density is desirable. In all cases, the invention applies to n phase systems where n is greater than 2 and a conductive winding is wound into a magnetically conducive base.

The invention claimed is:

1. A poly-phase electromagnetic device having n winding phases (where n is greater than 2), said device including:

n separate electrical conductor phase windings, each completed phase winding being in the form of a continuous electrical conductor strand;

a magnetically conducive base having a plurality of slots adapted to receive active portions of the phase windings therein;

each phase winding comprising a series of interconnected lap form sub-windings, with each sub-winding defining two active arms that extend through two spaced apart non-adjacent slots in the base, the active arms being joined by one or more suitably formed end turn and/or two connecting arms for connection with adjacent sub-windings or terminals; said active arms and end turn or end turns each formed to include one or more co-extending electrical conductor strands; and wherein said phase windings are configured such that on assembly of the phase windings to the magnetically conducive base there is a maximum of n−1 sub-winding end turns overlapping, while the lengths of the end turns are simultaneously minimized.

2. A device according to claim 1 wherein said end turn or end turns are each offset from the plane in which the active arms are formed to provide clearance between overlapping end turns and so optimize packing density of electrical conductor within the slots of the magnetically conducive base.

3. An electromagnetic device according to claim 2 having three phases.

4. A device according to claim 3 wherein said lap form sub-winding includes two or more full loops of conductor strand defining two active arms interconnected by two end turns, each arm and end turn including therein two or more generally co-extending conductor strands, with a lead in and a lead out from said loops defining the respective connecting arms.

5. A device according to claim 4 that has three phase windings each made from lap form sub-windings with alternative sub-windings being wound in opposite directions.

6. A device according to claim 4 wherein said alternate sub-windings have end turns offset in opposite directions.

7. A device according to claim 4 wherein the connecting arms are configured to extend within gaps formed closely adjacent the magnetically conducive base to assist in minimizing the overall dimensions of the assembly.

8. A device according to claim 4 wherein the lap form sub-windings are manufactured in the form of discrete bobbins comprising a multiple number of loops of conductor strand with connecting arms at each end for joining with an adjacent bobbin of the same phase.

9. A device according to claim 4 wherein the lap form sub-windings are formed from a continuous length of conductor strand to form interconnected lap form sub-windings.

10. A device according to claim 6 wherein said completed n phase windings are intertwined together in a plait like configuration to achieve n−1 end turn overlaps on assembly into the magnetically conducive base.

11. A device according to claim 5 wherein said connecting arms are located at different corners for a reverse wound lap form sub-winding as compared to a forward wound lap form sub-winding.

12. A method of manufacturing a device according to claim 10 whereby lap form sub-windings are wound on separate formers to produce individual "bobbins" which are then stacked into a slotted magnetically conducive base in a predetermined sequence and spacing to achieve a maximum of n−1 end turns overlapping and the bobbin connecting arms are then electrically joined in a plait like configuration to form the intertwined phases.

13. A method of manufacturing a device according to claim 10 whereby a completed phase winding is formed by directing winding of conductor strand into the slotted magnetically conducive base.

14. A method of manufacturing a device according to claim 10 whereby each phase is wound from a single continuous strand using a suitable winding machine and/or former to thereby create a string of interconnected lap form sub-windings.

15. A method according to claim 14 wherein each phase is made from a relatively thin and pliable electrical conductor strand which is wound into said string using an air coil winding machine.

16. A method according to claim 15 wherein alternating opposite offset end turns are accomplished by winding onto different appropriately configured formers.

17. A method according to claim 15 wherein alternating opposite offset end turns are accomplished by winding on the same formers but in opposite directions.

18. A method according to claim 15 wherein planar lap form sub-windings are first wound and then a press operation is used to subsequently achieve the alternating opposite end turn bends.

19. A method according to claim 15 wherein thermally bonded wire is used such that the final formed sub-windings can be heated to glue the loops of the sub-windings into a single solid component.

20. A method according to claim 14 wherein each phase is made from a relatively thick conductor strand and is wound using a CNC wire forming machine.

21. A method according to claim 15 wherein said completed phases are first plaited and then assembled into the magnetically conducive base.

22. A method of manufacturing a three phase device according to claim 14 wherein the assembly method includes the steps of:

placing active arms of an end sub-winding of a first phase string into two slots in an electrically conducive base with a first two vacant slots therebetween;

placing active arms of an end sub-winding of a second phase string into two slots in the base adjacent the first phase sub-winding with a second two vacant slots therebetween;

then placing the active arms of an end sub-winding of a third phase string into one of said first and second vacant slots between the assembled sub-windings of the first two phases; and manually or automatically inserting the remaining sub-windings in staggered pairs to thereby achieve a plaiting configuration resulting in a maximum of two overlapping end turns.

23. A device according to claim 4 wherein each phase comprises a first set of interconnected lap form sub-windings all having end turns offset in a first direction and a second set of interconnected lap form sub-windings with all end turns offset in an opposite direction, with each sub-winding having an extended end connector therebetween whereby plaiting is only required between those portions of the phases having the same direction of end turn offset and plaiting between overlapping end turns of the first and second sets is avoided.

24. A method of manufacturing a three phase device according to claim 23 comprising the steps of:

winding a first half of each phase from a single continuous strand using a former arrangement to create a first half string of interconnected lap form sub-windings having end turns all formed in a first direction;

winding a second half of each phase from a single continuous strand using a former arrangement to create a second half string of interconnected lap form sub-windings having end turns all formed in an opposite second direction;

assembling said first half of each phase in a plait like configuration onto said base without any end turns overlapping and with gaps between the active arms;

assembling said second half of each phase in a similar manner such that said second half of each phase is set into said gaps in said magnetically conducive base.

25. A method according to claim 24 wherein said first half of each phase is assembled directly into the magnetically conducive base and the second half of each phase is assembled onto a jig that mirrors the base and the assembled second half of each phase is then transferred onto the magnetically conducive base.

26. A device according to claim 3 wherein each lap form sub-winding has active arms that include only a single length of electrical conductor strand thereby resulting in a wave like winding formation comprising a series of spaced apart active arms that extend through spaced apart non-adjacent slots in the base, each active arm being connected at alternate ends to an end turn or terminal thereby eliminating the need for separate connecting arms.

27. A device according to claim 26 wherein each of said end turns or terminals are offset from the plane in which the active arms are formed to provide clearance between overlapping end turns and so optimize packing density of electrical conductor within the slots of the magnetically conducive base.

28. A device according to claim 26 wherein each phase winding is manufactured as a simple pressing or forged component.

29. A device according to claim 3 having an axial flux configuration.

30. A device according to claim 3 having a radial flux configuration.

31. A device according to claim 3 having a linear configuration.

* * * * *